No. 819,509. PATENTED MAY 1, 1906.
G. W. BOTTUM.
TOE WEIGHT FOR HORSES.
APPLICATION FILED AUG. 17, 1905.
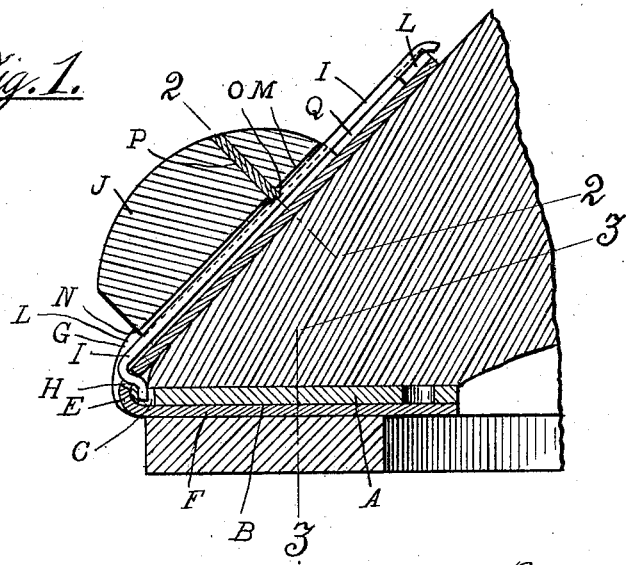
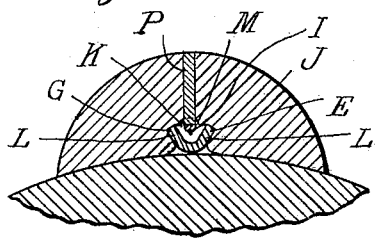
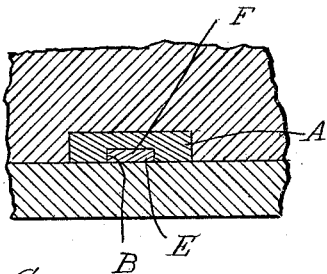
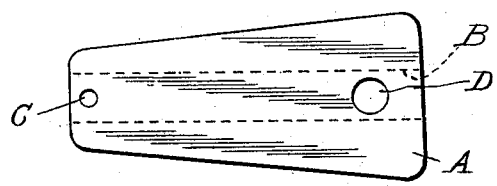
Witnesses
E. F. Wilson
R. A. Fischer
Inventor
George W. Bottum
By Rudolph M. Fox
Atty.

UNITED STATES PATENT OFFICE.

GEORGE W. BOTTUM, OF CHICAGO, ILLINOIS.

TOE-WEIGHT FOR HORSES.

No. 819,509.  Specification of Letters Patent.  Patented May 1, 1906.

Application filed August 17, 1905. Serial No. 274,640.

*To all whom it may concern:*

Be it known that I, GEORGE W. BOTTUM, a citizen of the United States, residing at Chicago, in the county of Cook and State of Illinois, have invented certain new and useful Improvements in Toe-Weights for Horses; and I do hereby declare the following to be a full, clear, and exact description of the invention, such as will enable others skilled in the art to which it appertains to make and use the same.

My invention relates to a novel construction in a removable toe-weight for horses, the object being to provide a device of this character which can be readily removed and replaced and which is simple, durable, and efficient; and it consists in the features of construction and combination of parts hereinafter fully described and claimed.

In the accompanying drawings, illustrating my invention, Figure 1 is a central vertical longitudinal section of a device constructed in accordance with my invention. Fig. 2 is a transverse section of same on the line 2 2 of Fig. 1. Fig. 3 is a vertical transverse section of same on the line 3 3 of Fig. 1. Fig. 4 is a top plan view of the hoof-plate.

In the construction of toe-weights it is desirable to avoid the use of screws or similar means for fastening the device or part thereof to the hoof, and, furthermore, to so place and construct the device as to avoid the projection in front of the hoof of any part which may be easily stubbed and worn off by the horse, and which, furthermore, would be likely to catch straw, cords, &c., which might be picked up in the road or in the stable.

It is further desirable to provide a device which can be readily removed without necessitating removal of the shoe and of which when the horse is not in action nearly all parts may be removed, so as to relieve the hoof of any excess weight.

To these and other ends my said device comprises, primarily, a hoof-plate A, which is wedge-shaped and is provided in its lower face with a longitudinal groove B. Said plate A is also provided at its forward end about the middle thereof with the opening C and adjacent its rear end with an opening D, the latter serving as means for engaging a hook to withdraw said plate from the hoof when desired. The said plate A is lodged in a wedge-shaped recess in the toe of the hoof and rests upon the shoe, said recess in the hoof being made to conform in shape and size with the forward end portion of the plate A, the latter being inserted from the rear and its forward movement limited by the engagement of its side faces with the side walls of the recess in the hoof. By forcing said plate firmly into said recess the same will be securely held by frictional contact.

A relatively V-shaped member E, one arm of which constitutes a tongue F, adapted to fit said recess B in plate A, is mounted upon the latter and secured in the manner hereinafter specified. The other arm of said member E comprises a V-shaped channel G, preferably formed of sheet metal and lying upon the toe portion of the hoof. The said member E is preferably made of sheet metal and is provided adjacent its lower end with a longitudinal slot H, through which an ogee-curved lower end of a spring I is adapted to pass. The free end of said ogee-curved portion of said spring I is adapted to enter and engage the said opening C in the member A and the inner end portion thereof to bear upon the upper wall of said slot H, upon which it turns as a fulcrum to draw said plate A and said member E toward each other. As before stated, the upper arm of said member E is substantially V-shaped, and said spring I is adapted to lie within the channel thereof. The said spring I is normally adapted to stand outwardly, so that its free end portion is disposed a considerable distance from the free end of the said channeled arm of said member E. The weight J is provided in its lower face with a dovetailed recess K to receive the free ends of the flanges L of said channeled arm of said member E and is provided in the bottom of said groove or recess with a substantial semicircular groove or recess M, which is adapted to receive the said spring I, which latter is preferably made of a suitable wire. In order to insert said weight over said channeled arm, the said free end of said spring I must be depressed, so that it lies practically within the channel and is maintained in this position by the said weight J. The latter is moved downwardly until it strikes the shoulders N, formed by slightly enlarging the flanges K of said channeled arm adjacent the lower end of the latter, the downward movement of said weight being thus limited. In order to prevent the accidental removal or throwing off of said weight, the spring I is provided between its ends with a notch or recess O, into which the projecting end of a pin P is adapted to spring when said weight reaches the lower limit of its movement, said pin being rigidly secured within the said weight by driving the same into a relatively small opening in the latter. In order to provide means for securing quarter-boots to the hoof, the said flanges K are cut away adjacent the free end of the said channeled arm, as at Q, to provide a recess through which a strap may be passed underneath the free end of said spring I. It will be noted that the weight J may be readily removed when not required, together with the said spring I and the member E, and the latter is so arranged as to project only very slightly beyond the toe portion of the shoe and hoof, so that stubbing thereof is practically entirely obviated, the entire device being thus rendered very durable. The plate A is securely held in place by the action of the said spring I and member E and the latter maintained in proper relative position thereby, so that screws or other fastening means which are entirely unreliable and injurious to the hoof are rendered unnecessary. The weight can be quickly removed and replaced. The plate A may also be removed, if desired, by inserting a hook in the opening D and withdrawing the same in an obvious manner.

I claim as my invention—

1. The combination with a wedge-shaped plate adapted to fit a wedge-recess in the hoof and provided with a longitudinal groove and having an opening in its smaller forward end, of a V-shaped weight-carrying member one arm of which is adapted to enter said groove in said plate, a weight slidably mounted on the other arm, and a spring-bar adapted to enter said opening in said wedge-shaped plate at one end and having its free end disposed to bear upon the elbow portion of said V-shaped plate and upon the said weight to hold the latter in place.

2. The combination with a wedge-shaped plate adapted to fit a wedge-shaped recess in the toe portion of the hoof, and having its smaller end disposed forward, said plate being provided with a longitudinal groove and with an opening in its forward end, of a V-shaped bar disposed with one arm parallel with the hoof and its other arm within said groove in said plate, a spring-bar having one end entering said opening in said plate and bearing between its ends against said V-shaped member, and a weight provided with a recess adapted to receive the free arm of said V-shaped member and the free end of said spring-bar, substantially as and for the purpose described.

3. The combination with a wedge-shaped plate adapted to fit a wedge-shaped recess in the toe portion of the hoof, and having its smaller end disposed forward, said plate being provided with a longitudinal groove and with an opening in its forward end, of a V-shaped bar disposed with one arm parallel with the hoof and its other arm within said groove in said plate, said free arm being wedge-shaped in cross-section and provided in its outer face with a groove, a spring-bar having an ogee-curved lower end adapted to enter and engage said spring in said plate and bearing adjacent said end against said V-shaped bar, and a weight provided in one face with a dovetail recess and with a groove in the bottom of said recess adapted to be inserted over said wedge-shaped arm and the free end of said opening-bar, substantially as and for the purpose described.

4. The combination with a wedge-shaped plate adapted to fit a wedge-shaped recess in the toe portion of the hoof, and having its smaller end disposed forward, said plate being provided with a longitudinal groove and with an opening in its forward end, of a V-shaped bar disposed with one arm parallel with the hoof and its other arm within said groove in said plate, said free arm being wedge-shaped in cross-section and provided in its outer face with a groove, a spring-bar having an ogee-curved lower end adapted to enter and engage said opening in said plate and bearing adjacent each end against said V-shaped bar, and a weight provided in one face with a dovetail recess and with a groove in the bottom of said recess adapted to be inserted over said wedge-arm and the free end of said spring-bar, said free end portion of said spring-bar being provided with a notch, and a projection disposed in said groove in said weight adapted to enter said notch to lock said bar in position on said V-shaped member.

In testimony whereof I have signed my name in presence of two subscribing witnesses.

GEORGE W. BOTTUM.

Witnesses:
RUDOLPH WM. LOTZ,
ROBERT A. FISCHER.